(12) United States Patent
Lai et al.

(10) Patent No.: US 11,057,675 B2
(45) Date of Patent: Jul. 6, 2021

(54) MEDIA STREAMING DEVICE AND PROTECTION METHOD OF THE SAME

(71) Applicant: Realtek Semiconductor Corporation, Hsinchu (TW)

(72) Inventors: Chao-Min Lai, Hsinchu (TW); Chien-Liang Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/208,788

(22) Filed: Dec. 4, 2018

(65) Prior Publication Data

US 2019/0373317 A1   Dec. 5, 2019

(30) Foreign Application Priority Data

Jun. 5, 2018 (TW) .................................. 107119367

(51) Int. Cl.
| | |
|---|---|
| *G06F 1/3203* | (2019.01) |
| *H04N 21/443* | (2011.01) |
| *H04N 21/41* | (2011.01) |
| *H04N 21/472* | (2011.01) |

(52) U.S. Cl.
CPC ....... *H04N 21/4436* (2013.01); *G06F 1/3203* (2013.01); *H04N 21/4104* (2013.01); *H04N 21/47217* (2013.01)

(58) Field of Classification Search
CPC .......... H04N 21/4436; H04N 21/4104; H04N 21/47217; G06F 1/3203

USPC .......................................................... 348/730
See application file for complete search history.

(56) References Cited

U.S. PATENT DOCUMENTS

| | | | |
|---|---|---|---|
| 7,672,107 B2* | 3/2010 | So ........................... | H02H 9/025 361/93.9 |
| 2010/0146333 A1* | 6/2010 | Yong ....................... | G06F 1/305 714/14 |
| 2011/0208456 A1* | 8/2011 | Mickelsen ................ | G06F 1/30 702/64 |
| 2013/0043929 A1* | 2/2013 | Chen ....................... | G06F 1/263 327/535 |
| 2018/0027207 A1* | 1/2018 | Wengreen ................ | H04N 5/63 348/730 |

(Continued)

*Primary Examiner* — Michael E Teitelbaum
*Assistant Examiner* — Omer Khalid
(74) *Attorney, Agent, or Firm* — Locke Lord LLP; Tim Tingkang Xia, Esq.

(57) ABSTRACT

A media streaming device is provided that includes a media streaming module, a super capacitor and a protection module. The media streaming module provides the media stream. The super capacitor has a first terminal coupled to a power-supplying path and a second terminal coupled to a ground terminal. The protection module includes a current limiter and a disabling unit. The current limiter receives a power signal and performs current-limiting to generate a fixed-current power to charge the super capacitor and supply power to the media streaming module through the power-supplying path. The current limiter further detects a voltage of the first terminal of the super capacitor. The disabling unit disables the media streaming module when the voltage of the first terminal of the super capacitor is not higher than a voltage threshold value, and enables the media streaming module when the voltage is higher than the voltage threshold value.

8 Claims, 2 Drawing Sheets

(56) References Cited

U.S. PATENT DOCUMENTS

2018/0351376 A1\* 12/2018 Park .................. H02H 5/12

\* cited by examiner

MEDIA STREAMING DEVICE AND PROTECTION METHOD OF THE SAME

RELATED APPLICATIONS

This application claims priority to Taiwan Application Serial Number 107119367, filed Jun. 5, 2018, which is herein incorporated by reference.

BACKGROUND

Field of Invention

The present invention relates to a media streaming technology. More particularly, the present invention relates to a media streaming device and a protection method of the same.

Description of Related Art

Due to the development of the network streaming technology in recent years, the over-the-top set-top box (OTT STB) or the TV stick become the mainstream of the multimedia equipments. By using the video streaming, the user can easily watch a diversity of channels through the network. However, when these equipments operate, the transient power of some inner components is too high such that a power having a large current is required. The cost of the power supply is increased.

Accordingly, what is needed is a media streaming device and a protection method of the same to address the issues mentioned above.

SUMMARY

An aspect of the present invention is to provide a media streaming device electrically coupled to a media playback device to provide a media stream thereto to be playback. The media streaming device includes a media streaming module, a super capacitor and a protection module. The media streaming module is configured to provide the media stream. The super capacitor has a first terminal electrically coupled to a power-supplying path and a second terminal electrically coupled to a ground terminal. The protection module includes a current limiter and a disabling unit. The current limiter is configured to receive a power signal and perform current-limiting on the power signal to generate a fixed-current power to charge the super capacitor through the power-supplying path and supply power to the media streaming module through the power-supplying path, wherein the current limiter is further configured to detect a voltage at the first terminal of the super capacitor. The disabling unit is configured to disable the media streaming module when the voltage of the first terminal of the super capacitor is not higher than a voltage threshold value, and configured to enable the media streaming module when the voltage is higher than the voltage threshold value.

Another aspect of the present invention is to provide a media streaming device protection method used in a media streaming device, wherein the media streaming device is electrically coupled to a media playback device to provide a media stream thereto to be playback. The media streaming device protection method includes the steps outlined below. A power signal is received by a current limiter of a protection module such that the current limiter performs current-limiting on the power signal to generate a fixed-current power to charge a super capacitor through a power-supplying path and supply power to a media streaming module through the power-supplying path, wherein the super capacitor has a first terminal electrically coupled to a power-supplying path and a second terminal electrically coupled to a ground terminal. A voltage at the first terminal of the super capacitor is detected and whether the voltage is higher than a voltage threshold value is determined by the current limiter. The media streaming module is disabled when the voltage of the first terminal of the super capacitor is not higher than the voltage threshold value by a disabling unit of the protection module. The media streaming module is enabled when the voltage is higher than the voltage threshold value such that the media streaming module provides the media stream by the disabling unit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
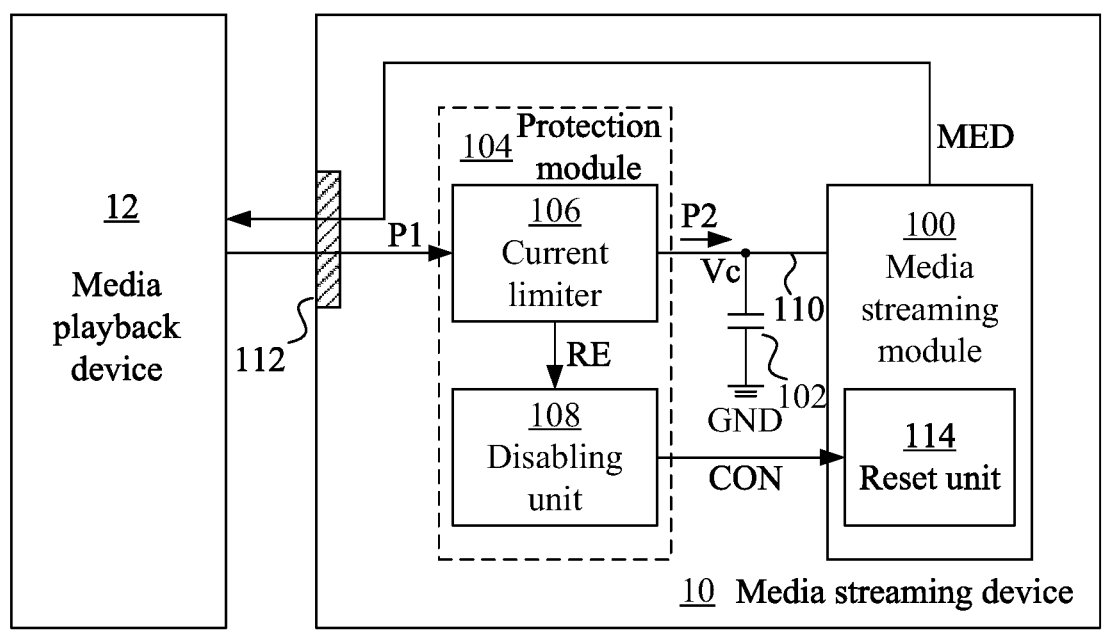
FIG. 1 is a block diagram of a media streaming device and a media playback device in an embodiment of the present invention.

Reference is now made to FIG. 1. FIG. 1 is a block diagram of a media streaming device 10 and a media playback device 12 in an embodiment of the present invention. The media streaming device 10 is electrically coupled to the media playback device 12 to provide a media stream MED thereto to be playback.

In an embodiment, the media streaming device 10 can be such as, but not limited to a over-the-top set-top box (OTT STB) or a TV stick. The media playback device 12 can be such as, but not limited to a TV.

The media streaming device 10 includes a media streaming module 100, a super capacitor 102 and a protection module 104.

The media streaming module 100 is configured to provide the media stream MED. In an embodiment, the media streaming module 100 may include such as, but not limited to a processing unit, a geographic processing unit and a network communication unit such as a WiFi communication unit (not illustrated) that can access Internet. As a result, the media streaming module 100 can be connected a remote server to access the media data in the remote server, process the media data and provide the media data in the form of the media stream MED to the media playback device 12 to be playback.

The super capacitor 102 has a first terminal electrically coupled to a power-supplying path 110 and a second terminal electrically coupled to a ground terminal GND. In an embodiment, the super capacitor 102 can be such as, but not limited to a electrochemical capacitor having high energy density that has a capacity that is hundreds or thousands times of the capacity of a common capacitor.

The protection module includes a current limiter 106 and a disabling unit 108.

The current limiter 106 is configured to receive a power signal P1 and perform current-limiting on the power signal P1 to generate a fixed-current power P2 to charge the super capacitor 102 through the power-supplying path 110.

In an embodiment, the media streaming device 10 further includes a universal serial bus (USB) port 112. The current limiter 106 actually receives the power signal P1 from the USB port 112.

In an embodiment, the media streaming device 10 is electrically coupled to the media playback device 12 through the USB port 112, and the power signal P1 is provided by the media playback device 12 through the USB port 112. However, the present invention is not limited thereto.

Since the power-supplying path 110 is actually electrically to the current limiter 106 and the media streaming module 100, the current limiter 106 supplies power to the media streaming module 100 through the power-supplying path 110 by using the fixed-current power P2 simultaneously.

The current limiter 106 is further configured to detect a voltage Vc at the first terminal of the super capacitor 102 and transmit the detection result RE to the disabling unit 108. According to the detection result RE, the disabling unit 108 is configured to disable the media streaming module 100 when the voltage Vc at the first terminal of the super capacitor 102 is not higher than a predetermined voltage threshold value and to enable the media streaming module 100 when the voltage Vc at the first terminal of the super capacitor 102 is higher than the predetermined voltage threshold value.

In an embodiment, the media streaming module 100 includes a reset unit 114. The disabling unit 108 is configured to transmit a control signal CON to the reset unit 114 such that the reset unit 114 resets the media streaming module 100 to disable the media streaming module 100 when the voltage Vc is not higher than the voltage threshold value.

When the voltage Vc is higher than the voltage threshold value, the disabling unit 108 stops transmitting the control signal CON to the reset unit 114 such that the reset unit 114 does not reset the media streaming module 100. As a result, the media streaming module 100 can be turned on and perform a start-up process. The enablement of the media streaming module 100 can be accomplished.

In an embodiment, after the media streaming module 100 is enabled, the media streaming module 100 starts to provide and transmit the media stream MED to the media playback device 12 through such as, but not limited to the USB port 112 to be playback.

In an embodiment, the voltage threshold value can be set as a predetermined ratio relative to an operation voltage of the media streaming module 100. For example, when the operation voltage of the media streaming module 100 is 4.8 volts, the voltage threshold value can be selected as 4.8 volts, 4.7 volts or 4.6 volts depending on the requirements.

It is appreciated that in an embodiment, when the voltage threshold value is set to be too high, the start-up speed of the media streaming device 10 becomes low. When the voltage threshold value is set to be too low, the media streaming device 10 may start up too fast such that the current amount of the power is not able to supply the charging of the super capacitor 102 and the start-up of the media streaming module 100.

As a result, in applications, the value of the voltage threshold value can be adjusted according to actual conditions to make the start-up speed and the current loading respectively accomplish a reasonable range.

When the media streaming device 10 starts to operate, a larger charging current is drained by the super capacitor 102 due to the large capacitance. However, when the source of the power signal P1, e.g. the media playback device 12, is not able to provide the power with large current, an abnormal condition may occur at the power-supply terminal. As a result, the power can be provided to the super capacitor 102 steadily by using the current limiter 106 that outputs the fixed-current power P2.

Further, when the media streaming device 10 starts to operate, the fixed-current power P2 is not able to supply the current amount for the charging of the super capacitor 102 and the start-up of the media streaming module 100 such that the media streaming module 100 may crash. As a result, by using the disabling unit 108 to disable the media streaming module 100 when the capacity of the super capacitor 102 is not full, the abnormal start-up condition of the media streaming module 100 can be avoided.

After the media streaming module 100 starts to operate to provide the media stream MED, a condition that the transient power consumption becomes too high (e.g. over 2.5 watts of power within 1 second) may occur to part of the components therein such as, but not limited to the processing unit, the graphic processing unit and the WiFi communication unit. A large transient current is required. Under such a condition, the media streaming module 100 can drain the required current from the super capacitor 102. The super capacitor 102 can provide a power stabilizing mechanism.

As a result, in an embodiment, the media streaming device 10 can directly receive the power of such as, but not limited to 5 volts and 500 milliampere (mA) from the media playback device 12 through the USB port 112. The required large current can be provided by the super capacitor 102 when the transient power consumption is too high without worrying that the power provided by the media playback device 12 can not match the large transient power consumption.

It is appreciated that the architecture of the media streaming device 10 described above is merely an example. In other embodiments, other electric components can be coupled between each two of the components in the media streaming device 10 without affecting the operation of the media streaming device 10. The present invention is not limited to the architecture illustrated in FIG. 1. Further, the media streaming device 10 receives the power from the media playback device 12 through the USB port in FIG. 1. However, in other embodiments, the media streaming device 10 may receive the power from other power suppliers through other power ports.

Figure 2:
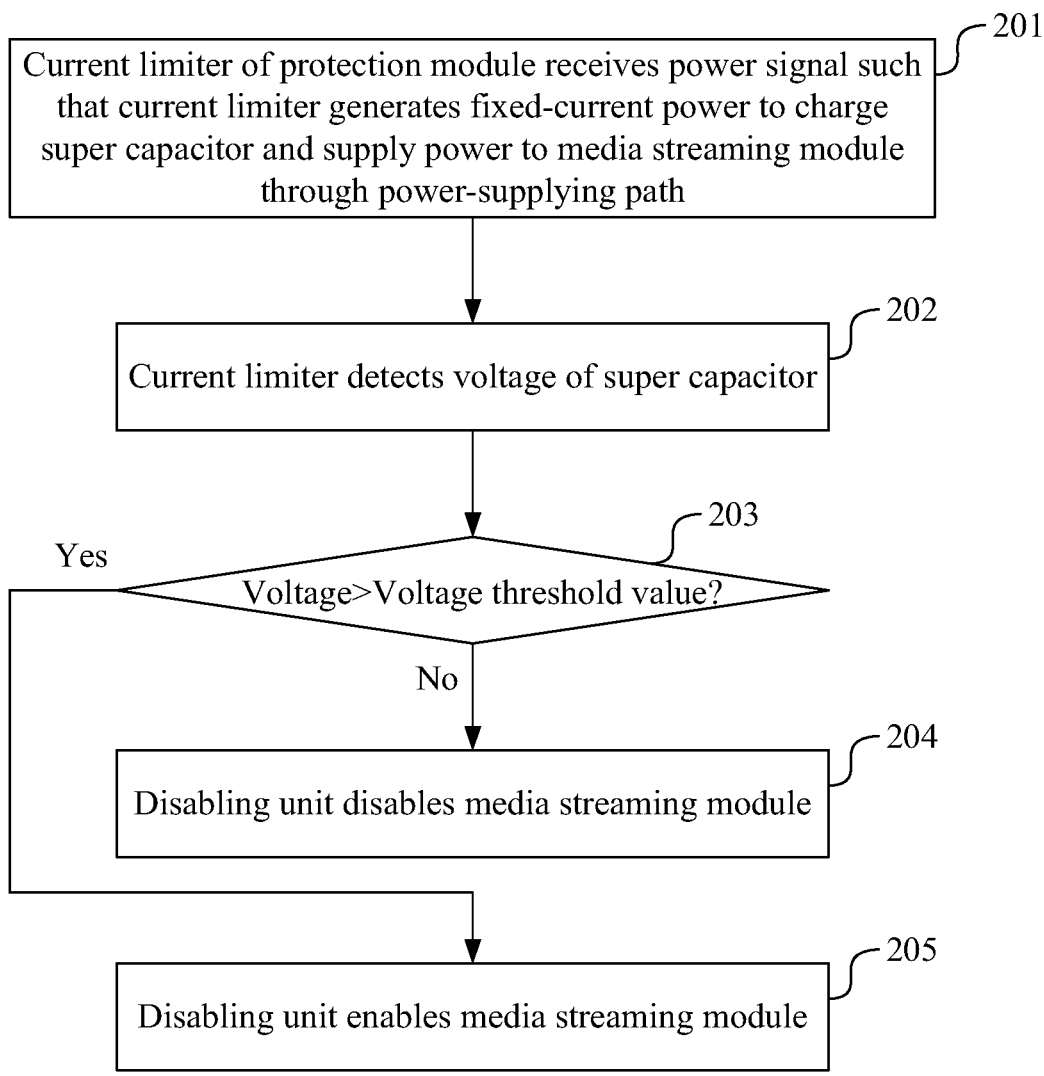
FIG. 2 is a flow chart of a media streaming device protection method in an embodiment of the present invention.

Reference is now made to FIG. 2. FIG. 2 is a flow chart of a media streaming device protection method 200 in an embodiment of the present invention. The media streaming device protection method 200 can be used in the media streaming device 10 illustrated in FIG. 1. The media streaming device protection method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, a power signal P1 is received by the current limiter 106 of the protection module 104 such that the current limiter 106 performs current-limiting on the power signal P1 to generate the fixed-current power P2 to charge the super capacitor 102 through the power-supplying path 110 and supply power to the media streaming module 100 through the power-supplying path 110.

In step 202, the voltage Vc at the first terminal of the super capacitor 102 is detected by the current limiter 106.

In step 203, whether the voltage Vc is higher than the voltage threshold value is determined by the current limiter 106.

When the voltage Vc of the first terminal of the super capacitor 102 is not higher than the voltage threshold value, in step 204, the disabling unit 108 disables the media streaming module 100.

When the voltage Vc is higher than the voltage threshold value, in step 205, the disabling unit 108 enables the media streaming module 100 such that the media streaming module 100 provides the media stream MED.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A media streaming device electrically comprising:
   a media streaming module comprising a reset unit;
   a super capacitor having a first terminal electrically coupled to the media streaming module and a second terminal electrically coupled to a ground terminal; and
   a protection module comprising:
      a current limiter electrically coupled to the first terminal of the super capacitor, the current limiter configured to receive a power signal to power on the media streaming device and perform current-limiting on the power signal to generate a fixed-current power to charge the super capacitor; and
      a disabling circuit configured to disable the media streaming module after the media streaming device is powered on and until the super capacitor is charged to a voltage higher than a predetermined voltage threshold, and configured to transmit a control signal to the reset unit such that the reset unit resets the media streaming module to disable the media streaming module when the voltage of the super capacitor is not higher than the predetermined voltage threshold after the media streaming device is powered on, and configured to stop transmitting the control signal to the reset unit when the voltage of the super capacitor is higher than the predetermined voltage threshold;
   wherein the media streaming module is started-up by the fixed-current power for processing media data in a form of a media stream and transmitting the media stream to a media playback device after the disabling circuit stops disabling the media streaming module.

2. The media streaming device of claim 1, wherein the predetermined voltage threshold has a predetermined ratio relative to an operation voltage of the media streaming module.

3. The media streaming device of claim 1, wherein the media streaming module drains a large transient current from the super capacitor when the media streaming module provides the media stream.

4. The media streaming device of claim 1, wherein the power signal is provided by the media playback device.

5. The media streaming device of claim 4, further comprising a universal serial bus (USB) port, in which the current limiter receives the power signal from the USB port.

6. The media streaming device of claim 1, wherein the media streaming device is a over-the-top set-top box (OTT STB) or a TV stick.

7. A media streaming device protection method used in a media streaming device that has a media streaming module, a super capacitor and a protection module, the media streaming device comprising a reset unit, and the media streaming device protection method comprising:
   receiving a power signal by a current limiter of the protection module to power on the media streaming device, such that the current limiter performs current-limiting on the power signal to generate a fixed-current power to charge the super capacitor;
   disabling the media streaming module by a disabling circuit of the protection module after the media streaming device is powered on and until the super capacitor is charged to a voltage higher than a predetermined voltage threshold;
   transmitting a control signal to the reset unit by the disabling circuit such that the reset unit resets the media streaming module to disable the media streaming module when the voltage of the super capacitor is not higher than the predetermined voltage threshold after the media streaming device is powered on;
   stopping transmitting the control signal to the reset unit by the disabling circuit when the voltage of the super capacitor is higher than the predetermined voltage threshold; and
   starting up the media streaming module by the fixed-current power for processing media data in a form of a media stream and transmitting the media stream to a media playback device after the disabling circuit stops disabling the media streaming module.

8. The media streaming device protection method of claim 7, wherein the predetermined voltage threshold has a predetermined ratio relative to an operation voltage of the media streaming module.

* * * * *